United States Patent
Shi

(10) Patent No.: US 9,947,990 B2
(45) Date of Patent: Apr. 17, 2018

(54) COIL APPARATUS OF MOBILE TERMINAL

(71) Applicant: ZTE CORPORATION, Shenzhen, Guangdong Province (CN)

(72) Inventor: Qingwei Shi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 233 days.

(21) Appl. No.: 14/779,018

(22) PCT Filed: Aug. 23, 2013

(86) PCT No.: PCT/CN2013/082207
§ 371 (c)(1),
(2) Date: Sep. 22, 2015

(87) PCT Pub. No.: WO2014/183352
PCT Pub. Date: Nov. 20, 2014

(65) Prior Publication Data
US 2016/0064803 A1    Mar. 3, 2016

(30) Foreign Application Priority Data

May 15, 2013 (CN) ..................... 2013 2 0265555 U

(51) Int. Cl.
*H01Q 1/24*  (2006.01)
*H02J 50/10*  (2016.01)
(Continued)

(52) U.S. Cl.
CPC ............... *H01Q 1/243* (2013.01); *H01Q 7/00* (2013.01); *H02J 7/025* (2013.01); *H02J 17/00* (2013.01); *H02J 50/10* (2016.02)

(58) Field of Classification Search
CPC ........ H01Q 1/243; H01Q 1/38; H01Q 9/0421; H01Q 1/42; H01Q 7/00
(Continued)

(56) References Cited

U.S. PATENT DOCUMENTS

| 6,115,585 A | 9/2000 | Matero et al. |
| 2007/0279002 A1 | 12/2007 | Partovi |

(Continued)

FOREIGN PATENT DOCUMENTS

| CN | 201178407 Y | 1/2009 |
| CN | 102646875 A | 8/2012 |

(Continued)

*Primary Examiner* — Dameon E Levi
*Assistant Examiner* — Collin Dawkins
(74) *Attorney, Agent, or Firm* — Ling Wu; Stephen Yang; Ling and Yang Intellectual Property

(57) ABSTRACT

A coil apparatus of a mobile terminal is disclosed, comprising: a metal coil embedded, in a flat spiral shape, in an inner side of a rear cover of a mobile terminal; an analog switch connected between the metal coil, a wireless charging chip and a signal receiving chip. The embodiment of the present document combines an antenna for receiving a frequency modulated signal with a wireless charging coil, and uses a same group of coils, and embeds the metal coil in the inner side of the rear cover of the mobile terminal, which increases the area of the coil and lengthens the length of the coil, simultaneously improves the efficiency of the wireless charging and the performance for receiving the frequency modulated signal.

4 Claims, 2 Drawing Sheets

(51) Int. Cl.
*H02J 17/00* (2006.01)
*H01Q 7/00* (2006.01)
*H02J 7/02* (2016.01)

(58) Field of Classification Search
USPC .................. 343/702, 872, 878, 789, 732
See application file for complete search history.

(56) References Cited

U.S. PATENT DOCUMENTS

| | | | |
|---|---|---|---|
| 2009/0001930 A1* | 1/2009 | Pohjonen | H01Q 1/2225 320/108 |
| 2010/0225542 A1* | 9/2010 | Suzuki | H01Q 1/243 343/700 MS |
| 2011/0199046 A1 | 8/2011 | Tsai et al. | |
| 2013/0015718 A1 | 1/2013 | Jung et al. | |
| 2013/0038278 A1* | 2/2013 | Park | H02J 7/00 320/108 |

FOREIGN PATENT DOCUMENTS

| | | |
|---|---|---|
| CN | 102984348 A | 3/2013 |
| JP | 2009253649 A | 10/2009 |
| JP | 2012517206 A | 7/2012 |
| KR | 20100111075 A | 10/2010 |
| KR | 101185681 B1 | 9/2012 |
| KR | 20130015618 A | 2/2013 |
| KR | 10-2013-0048749 | 5/2013 |
| WO | 20120082570 A1 | 6/2012 |

\* cited by examiner

COIL APPARATUS OF MOBILE TERMINAL

TECHNICAL FIELD

The present document relates the field of the mobile terminal, more particularly, to a coil apparatus of a mobile terminal.

BACKGROUND OF THE RELATED ART

The technique of wireless charging is a technique which utilizes the electromagnetic wave induction principle and the related technique of alternating current induction, and corresponding coils are used on a transmitting end and a receiving end to transmit and receive alternating signals that produce induction to charge. At present, electromagnetic-induction-type wireless charging is commonly used. The principle of the electromagnetic-induction-type wireless charging is that a primary coil is set on one side of a charger, a alternating current with a certain frequency is loaded on the primary coil, a certain current is produced on the secondary coil by the electromagnetic induction, thereby the energy is transferred from the transmitting end to the receiving end. The less the differences between the sizes of the secondary coils are, the less the energy transfer loss is, and the higher the efficiency of the wireless charging is. However, the primary coil on the wireless charger is made relatively big, aiming that the secondary coil is placed on what position of the mobile terminal to make the differences between the sizes of the secondary coils become less, we need to find the position on the smart mobile terminal to place the secondary coil.

On the other hand, frequency modulation (FM) radios are more and more applied in wireless terminals especially in mobile phones. Since the FM broadcasting band is generally between 80 MHz and 110 MHz, thereby an antenna of the FM radio is required between 70 cm and 100 cm. It is not realistic to make such a long antenna on Printed Circuit Board (PCB) of the wireless terminal. The traditional method is to use an earphone wire as the antenna of the FM radio, but in this case, if earphones are not inserted, a FM radio function is unable to be used, thereby the inconvenience is caused.

SUMMARY

The purpose of the present document is to provide a coil apparatus of a mobile terminal, which combines a wireless charging coil with an antenna of a frequency modulation (FM) radio, uses a same group of metal coils, and it is made on a rear cover of the mobile terminal. That is, the coil apparatus of the mobile terminal serves as a wireless charging coil, and simultaneously multiplexes an FM broadcasting antenna, so that not only the wireless charge efficiency is improved, but also the multiplexing function is achieved, thereby the cost is saved.

One aspect of the present document provides a coil apparatus of a mobile terminal, comprising:
a metal coil;
an analog switch connected between the metal coil and a wireless charging chip and a signal receiving chip.

Preferably, the metal coil is embedded, in a flat spiral shape, in an inner side of a real cover of the mobile terminal.

Preferably, the coil apparatus further comprises a coil connection device which is connected between the metal coil and the analog switch.

Preferably, the analog switch comprises a first analog switch and a second analog switch.

Preferably, input ends of the first analog switch and the second analog switch respectively connect with two ends of the metal coil through the coil connection device, first output ends of the first analog switch and the second analog switch respectively connect with two ends of the wireless charging chip, a second output end of the first analog switch connects with one end of the signal receiving chip, a second output end of the second analog switch is grounded, enable ends of the first analog switch and the second analog switch respectively connect with a base band processing chip.

Preferably, the coil connection device comprises:
a first metal contact and a second metal contact respectively set on the two ends of the metal coil;
a first metal dome and a second metal dome respectively set on positions corresponding to the first metal contact and the second metal contact on a Printed Circuit Board (PCB) motherboard of the mobile terminal.

Preferably, the first metal contact and the second metal contact are respectively embedded on the two ends of the metal coil in the inner side of the rear cover of the mobile terminal.

Preferably, the signal receiving chip is an FM radio chip or a Near Field Communication (NFC) chip or a digital television chip.

Compared to the prior art, the beneficial effect of the embodiment of the present document is described below.

The embodiment of the present document combines the antenna of the FM radio with the wireless charging coil, and uses a same group of the metal coils. The metal coils are embedded in the rear cover, which increases the area of the coil and lengthens the length of the coils, simultaneously improves the wireless charging efficiency and the performance for receiving the FM radio signal, and saves the cost.

The structure and principle of the present document will be described in details below, in conjunction with accompanying drawings.

PREFERRED EMBODIMENTS OF THE INVENTION

The embodiment of the present document will be described in details in combination with the accompanying drawings below, it should be understood that, the preferred embodiment described below is only used to illustrate and explain the present document, not used to limit the present document.

Figure 1:
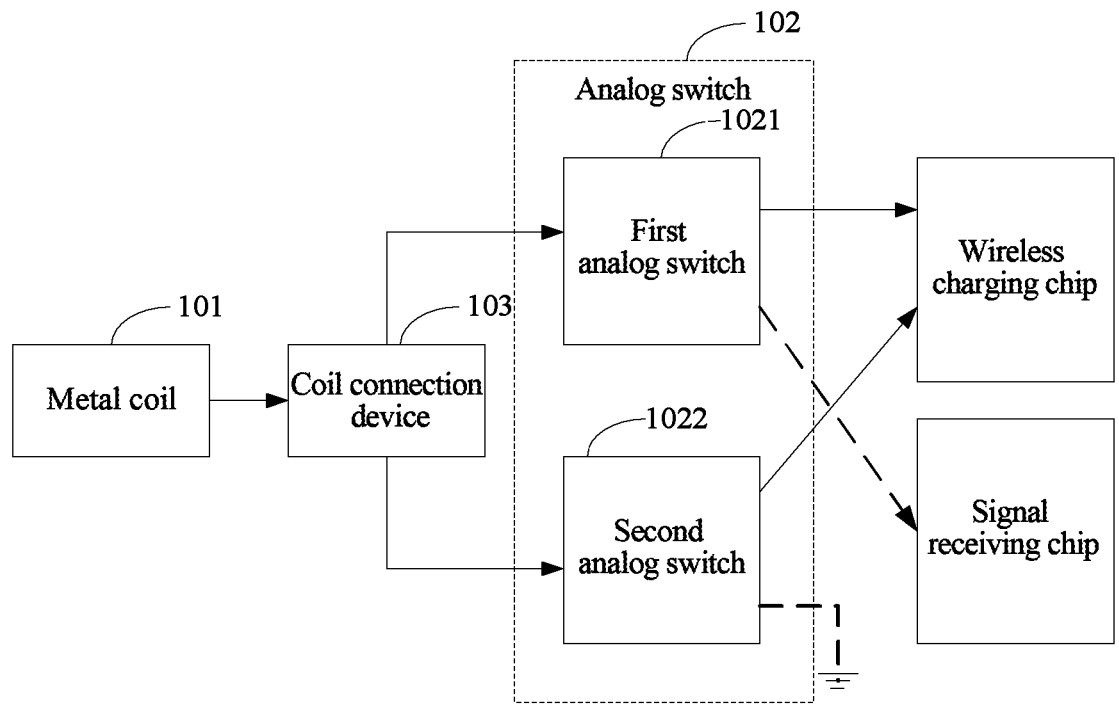
FIG. 1 is a schematic diagram of a coil apparatus of a mobile terminal according to the embodiment of the present document.

FIG. 1 illustrates a schematic diagram of a coil apparatus of a mobile terminal according to the present document, as shown in FIG. 1, comprising: a metal coil 101; an analog switch 102 connected between the metal coil and a wireless charging chip and a signal receiving chip. Wherein, the metal coil is embedded, in a flat spiral shape, in an inner side of a rear cover of the mobile terminal.

The signal receiving chip is an FM radio chip or an NFC chip or a digital television chip.

The present document further comprises a coil connection device 103 which is connected between the metal coil 101 and the analog switch 102.

The analog switch 102 comprises a first analog switch 1021 and a second analog switch 1022. Input ends of the first analog switch and the second analog switch respectively connect with two ends of the metal coil 101 through the coil connection device 103, first output ends of the first analog switch and the second analog switch respectively connect with two ends of the wireless charging chip, so that the metal coil 101 serves as a secondary coil to charge a battery of the mobile terminal, a second output end of the first analog switch connects with one end of the signal receiving chip, a second output end of the second analog switch is grounded, so that the metal coil 101 serves as an antenna used for the signal receiving chip to receive an FM signal, enable ends of the first analog switch and the second analog switch respectively connect with a base band processing chip which is used to control switching between the first analog switch and the second switch analog switch.

The coil connection device 103 comprises: a first metal contact and a second metal contact respectively set on two ends of the metal coil 101; a first metal dome and a second metal dome respectively set on positions corresponding to the first metal contact and the second metal contact on a Printed Circuit Board (PCB) motherboard of the mobile terminal.

Specifically, the first metal contact and the second metal contact are respectively embedded on the two ends of the metal coil 101 in the inner side of the rear cover of the mobile terminal.

Figure 2:
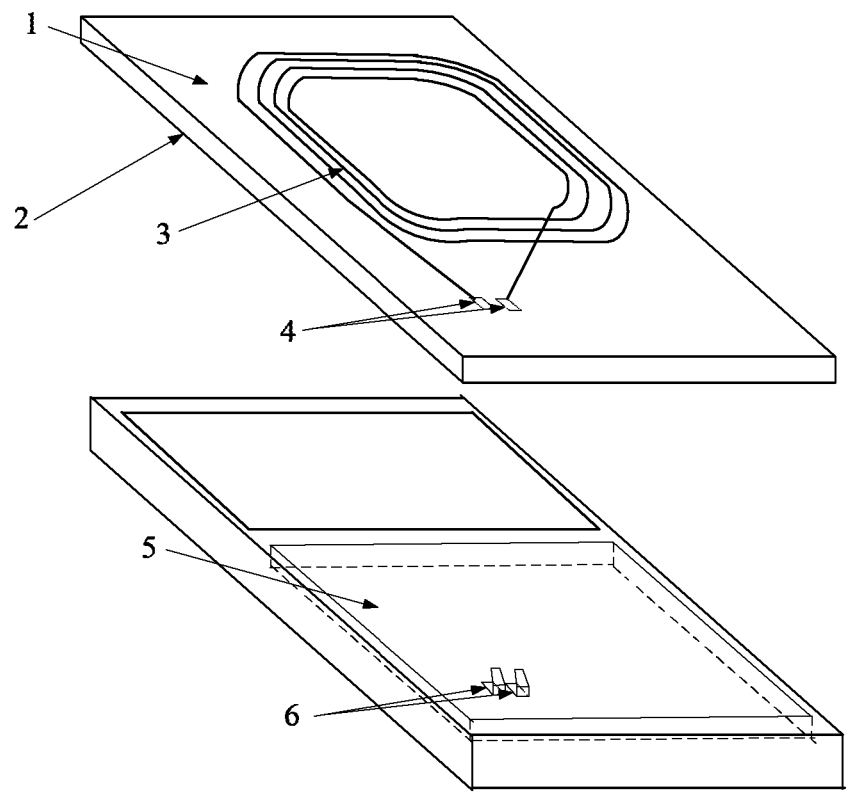
FIG. 2 is a schematic diagram of a whole structure of the mobile terminal according to the embodiment of the present document.

FIG. 2 illustrates a schematic diagram of a whole structure of the mobile terminal according to the embodiment of the present document, as shown in FIG. 2, mainly comprising a metal coil 3 and a metal contact 4 of the coil and a metal dome 6 on the PCB board. Wherein, the metal coil 3 twines in a flat spiral shape, and is installed on the inner side 2 of the rear cover of the mobile terminal in a form of an embedded way. Then two ends of the metal coil 3 connect onto the metal contact 4, similarly the metal contact 4 is embedded on the inner side 2 of the rear cover of the mobile terminal, two metal domes 6 are installed on the PCB mother board 5 of the mobile terminal, when the rear cover 1 of the mobile terminal covers on the mobile terminal, the metal contact 4 presses on the metal dome 6 to make the wireless charging coil connect a charging circuit and a signal receiving circuit which receives an FM signal through the antenna.

Figure 3:
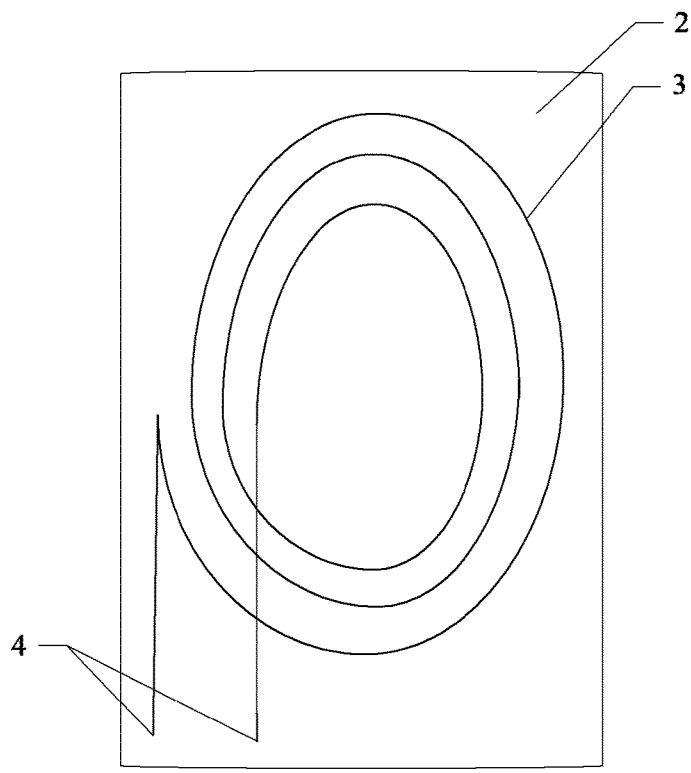
FIG. 3 is a schematic plan of a card cover of the mobile terminal according to the embodiment of the present document.

FIG. 3 illustrates a schematic plan of a card cover of the mobile terminal according to the embodiment of the present document, as shown in FIG. 3, the metal coil 3 is embedded, in a flat spiral shape, in the inner side of the back card cover back of the mobile terminal 2 by twining, the two joints of the coil are respectively connected with metal contacts 4.

Figure 4:
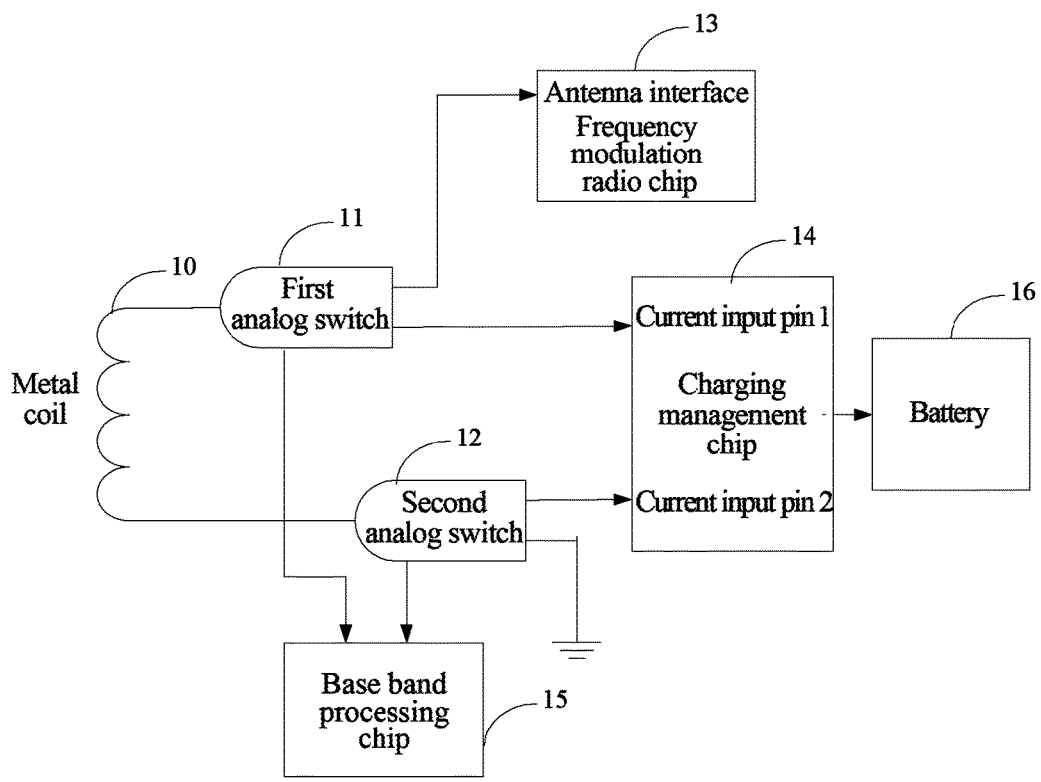
FIG. 4 is a schematic diagram of switching between charging and an FM radio according to the embodiment of the present document.

FIG. 4 illustrates a circuitry of switching between charging and an FM radio, as shown in FIG. 4, a base band processing chip controls an analog switch 11 and an analog switch 12 to switch a connection path of a metal coil 10. The first analog switch 11 and the second analog switch 12 are, by default, connected to a charging management chip 14, the metal coil 10 serves as a secondary coil to charge a battery 16; when a user turns on the FM radio function, the base band processing chip 15 controls the first analog switch 11 and the second analog switch 12 to switch the connection path of the metal coil 10, the first analog switch 11 connects to the FM radio chip 13, the second analog switch 12 is grounded, the metal coil 10 serves as the antenna of the FM radio to receive a FM radio signal.

That is, the analog switch are added on the path connecting the metal coil, the FM radio chip and the charging management chip, the analog switch is controlled by the base band processing chip for switching. Under a default state, the analog switch connects the metal coil with the charging management chip to make the metal chip serve as the secondary coil to charge the battery; when the user turns on the FM radio function, the base band chip controls the analog switch to connect the metal coil with the FM radio chip, at this moment, the metal coil serves as the antenna to be used.

In order to increase the area of the metal coil, the embodiment of the present document embeds, in a flat spiral shape, the metal coil on the rear cover of the mobile terminal, and adds metal contacts on two joints of the metal coil respectively, and adds the metal domes on the same positions of the PCB mother board, so that the metal coil connects with the metal contacts through the metal domes. The metal domes on the PCB mother board connect with the wireless charging chip and the signal receiving chip through traces.

Although the present document has been described on above, but the present document is not limit to this, those skilled persons in the art will make various modifications according to the principle of the present document. Therefore, all modifications made according to the principle of the present document should be understood to fall within the protection scope of the present document.

INDUSTRIAL APPLICABILITY

In conclusion, the embodiments of the present document have the following technical effects:

The embodiment of the present document combines the antenna for receiving the FM radio with the wireless charging secondary coil, and uses a same group of the metal coils. The metal coil is embedded in the inner side of the rear cover, which increases the area of the metal coil and lengthens the length of the metal coils, simultaneously improves the wireless charging efficiency and the receiving performance for receiving the FM signal, and saves the cost.

What we claim is:

1. A coil apparatus of a mobile terminal, comprising:
a metal coil;
an analog switch connected between the metal coil and a wireless charging chip and a signal receiving chip,
wherein, the metal coil is embedded, in a flat spiral shape, in an inner side of a rear cover of the mobile terminal,
wherein the coil apparatus further comprises a coil connection device which is connected between the metal coil and the analog switch,
wherein the analog switch comprises a first analog switch and a second analog switch,
wherein input ends of the first analog switch and the second analog switch respectively connect with two ends of the metal coil through the coil connection device, first output ends of the first analog switch and the second analog switch respectively connect with two ends of the wireless charging chip, a second output end of the first analog switch connects with one end of the signal receiving chip, a second output end of the second analog switch is grounded, enable ends of the first analog switch and the second analog switch respectively connect with a base band processing chip.

2. The coil apparatus of the claim 1, wherein the coil apparatus further comprises:
   a first metal contact and a second metal contact respectively set on the two ends of the metal coil;
   a first metal dome and a metal second dome respectively set on positions corresponding to the first metal contact and the second metal contact on a Printed Circuit Board (PCB) motherboard of the mobile terminal.

3. The coil apparatus of claim 2, wherein the first metal contact and the second metal contact are respectively embedded on the two ends of the metal coil in the inner side of the rear cover of the mobile terminal.

4. The coil apparatus of claim 1, the signal receiving chip is a Frequency Modulation (FM) radio chip or a Near Field Communication (NFC) chip or a digital television chip.

* * * * *